United States Patent
Sahebrao et al.

(10) Patent No.: US 8,763,749 B2
(45) Date of Patent: Jul. 1, 2014

(54) OPERATING MECHANISM FOR CRUISE CONTROL AND MOTION CONTROL IN AN OFF-ROAD VEHICLE OPERATING ON HYDROSTATIC TRANSMISSION

(75) Inventors: Patil Lalit Sahebrao, Dist Jalgaon (IN); Sakaleshpur Bhanuprakash Anumantha Rao, Mumbai (IN); Bhagwat Vishwanath Vishnu, Mumbai (IN)

(73) Assignee: Mahindra & Mahindra Ltd., Mumbai (IN)

( * ) Notice: Subject to any disclaimer, the term of this patent is extended or adjusted under 35 U.S.C. 154(b) by 0 days.

(21) Appl. No.: 13/982,751

(22) PCT Filed: Jan. 31, 2012

(86) PCT No.: PCT/IN2012/000073
§ 371 (c)(1),
(2), (4) Date: Jul. 31, 2013

(87) PCT Pub. No.: WO2012/104871
PCT Pub. Date: Aug. 9, 2012

(65) Prior Publication Data
US 2014/0000402 A1    Jan. 2, 2014

(30) Foreign Application Priority Data
Jan. 31, 2011    (IN) .......................... 264/MUM/2011

(51) Int. Cl.
*B60K 17/00* (2006.01)
(52) U.S. Cl.
USPC ...................................... 180/336; 74/473.17

(58) Field of Classification Search
USPC .......... 180/336, 333, 334; 74/473.17, 473.19, 74/478
See application file for complete search history.

(56) References Cited

U.S. PATENT DOCUMENTS

| | | | |
|---|---|---|---|
| 3,262,525 A | 7/1966 | Ehlke | |
| 3,691,863 A | 9/1972 | Shaffer | |
| 4,129,047 A | 12/1978 | Dornan | |
| 4,759,417 A * | 7/1988 | Wanie et al. | 180/6.34 |
| 4,883,137 A * | 11/1989 | Wanie et al. | 180/6.34 |
| 5,022,477 A * | 6/1991 | Wanie | 180/6.34 |
| 5,083,542 A * | 1/1992 | Kishimoto | 123/400 |
| 5,228,360 A * | 7/1993 | Johnson | 74/512 |
| 6,237,711 B1 * | 5/2001 | Hunt | 180/336 |
| 6,279,937 B1 | 8/2001 | Hunt | |
| 6,704,637 B1 * | 3/2004 | Hrazdera et al. | 701/93 |
| 2004/0074692 A1 | 4/2004 | Rupiper | |

* cited by examiner

*Primary Examiner* — Faye M. Fleming
(74) *Attorney, Agent, or Firm* — Henry J. Cittone; Cittone & Chinta LLP

(57) ABSTRACT

An operating mechanism (178) for disengaging a cruise control lever (176) operatively engaged with a hydrostatic transmission of an off-road vehicle, the cruise control lever (176) rotatably mounted over a cruise shaft bracket (188) and capable of being acted upon by biasing and counter-biasing forces along a rotational axis of the cruise control lever (176), the operating mechanism (178) comprising, a first cable (226) and a second cable (228), the first and second cables (226, 228) coupled to LH and RH brake pedals (222, 224), respectively, via their one end and extending to be operatively coupled to a brake actuation linkage assembly (230) via their opposite end, a cable holding member (232) formed to have equilateral triangular ends and coplanarly arranged between the first and second cables (226, 228).

12 Claims, 6 Drawing Sheets

OPERATING MECHANISM FOR CRUISE CONTROL AND MOTION CONTROL IN AN OFF-ROAD VEHICLE OPERATING ON HYDROSTATIC TRANSMISSION

CROSS-REFERENCE TO RELATED APPLICATIONS

This application is the U.S. National Phase of International Patent Application PCT/IN2012/000073, filed Jan. 31, 2012, which claims priority to Indian Patent Application No. 264/MUM/2011, filed Jan. 31, 2011, the disclosures of each of which are hereby incorporated by reference in their entirety.

FIELD OF THE INVENTION

The present invention relates generally to off-road vehicles operating on hydrostatic transmission and more particularly to, operating mechanism for disengaging cruise control lever from the hydrostatic transmission. The present invention also relates to an operating mechanism for controlling the ground speed of the off-road vehicles in forward and reverse directions.

DESCRIPTION OF THE BACKGROUND ART

Off-road vehicles such as tractors, lawn and garden tractors, earth movers, or the like vehicles operating on gear transmission or hydrostatic transmission have been there in market for quite some time. Typically, off-road vehicles can be broadly classified into two categories. First, heavy duty off-road vehicles having greater horse power (HP) used for large scale operations and second, off-road vehicles having comparatively smaller horse power for small scale operations. Examples of heavy duty off-road vehicles include agricultural tractors and earth movers whereas, home tractors, lawn and garden tractors, front mount mowers are examples of the second category of off-road vehicles. Further, usage of the smaller HP off-road vehicles in hobby farming is also well known where a person; in his/her spare/leisure time, uses such off-road vehicles for farming, gardening, or ploughing operations.

Off-road vehicles operating on transmission systems allow power generated by an engine to be mechanically transferred towards wheel & axle assembly in a controlled manner. Types of transmission system include gear transmission, power transmission, or hydrostatic transmission (HST). Generally, smaller HP off-road vehicles operating on gear transmission include a manually operated gear lever that is selectively operable in at least four forward/reverse positions. Further, a range-selection lever is also provided within such off-road vehicles, as a part of the gear transmission, to allow the operator with options of selecting range of speed levels within a particular gear shift. Typically, the range selection lever can be positioned between three available speeds levels (high, medium, and low). Thus, the operator driving such off-road vehicles has options of 12 forward and/or 12 reverse speed selections so as to operate the off-road vehicle at the desired speed levels. Such selections can be made by selectively setting the gear and range selection levers at appropriate positions. However, there is at least one prominent drawback associated with smaller HP off-road vehicles operating on gear transmission, especially during hobby farming. During hobby farming the operator needs to frequently manoeuvre and control the off-road vehicle in forward/reverse directions at various speed levels. In order to do so, the operator manually needs to continuously actuate/de-actuate accelerator and simultaneously change various gear and range selection levers. After some time, this process becomes quite tiring and discomforting to the operator. Another problem associated with such gear systems is that the operator needs to shift his hand regularly from the steering wheel to control the levers. This results in loss of concentration from the task on hand thereby resulting in lesser productivity and lesser efficiency.

In order to solve the above mentioned problems upto certain extent some manufacturers have eliminated the use of gears and introduced the system of hydrostatic transmission in the off-road vehicles. Further, in order to actuate the hydrostatic transmission, a treadle pedal control mechanism is introduced and provided on the foot plate of the off-road vehicle. The treadle pedal can be operated in both the forward and reverse directions by heel and toe, respectively, to control the forward and reverse directional movement of the off-road vehicle. The treadle pedal is mechanically connected to the hydrostatic transmission system through a mechanical linkage to allow actuation of the transmission system when the treadle pedal is operated in forward/reverse directions. However, the treadle pedal arrangement comes with its own problems like. For example, the operator positions his foot on the treadle pedal in such a manner that the toe and heel are positioned on the two opposite ends thereof and for providing motion to the vehicle in the forward direction the operator applies pressure by toe and for reverse direction by heel. This is also quite discomforting and tiring to the operator during prolonged operations.

Manufacturers have identified this problem and have replaced the sea-saw type treadle pedal with two separate dedicated pedals positioned adjacent to each other on the foot plate. On pressing the left pedal, the hydrostatic transmission can be actuated to provide forward motion to the vehicle and on pressing the right pedal the vehicle can be provided reverse motion. Additionally, usage of mechanical linkage is also been replaced with electronics systems such as sensors, microcontrollers to control the actuation of the hydrostatic transmission systems. Such electronically coupled hydrostatic transmission systems work quite satisfactorily unless they are not subjected to rough weather/ground conditions and breakdowns. In rough weather/ground conditions, electronic systems are prone to be damaged resulting in frequent breakdowns. Additionally, in breakdown conditions, it becomes quite difficult to take the vehicle from the field to the nearby mechanic resulting in service issues. Thus, there is a need to provide a simpler mechanical linkage system that connects the two dedicated forward/reverse pedals with the hydrostatic transmission system that addresses at least some of the above mentioned drawbacks.

Further, from view of safety standards being maintained while manufacturing of such off-road vehicles in competitive markets, a much safer and secure safety neutral switch 166 needs to be provided. Though safety switches have been present in off-road vehicles for quite some time so as prevent any untoward incident, coupling of neutral switches with the two dedicated pedals in safer manner needs some improvement. Thus, there is a need to provide a mechanical arrangement that addresses this need.

Nowadays, cruise control systems have also been introduced in off-road vehicles. Cruise system when actuated, allows the off-road vehicles to move at a constant speed irrespective of the ground conditions, but only in forward direction. Thus, the cruise system obviates the need of continuously pressing the forward pedal. A spring-loaded cruise control lever is provided adjacent to the seat of the operator and mechanically coupled to the hydrostatic transmission actuation means to provide its actuation in forward direction only. However, in order to disengage the cruise control lever from the hydrostatic transmission or, to position the cruise control lever in its neutral position, the cruise control lever is mechanically coupled with the two brakes (LH & RH). It is known that when both the LH & RH brakes are applied, the mechanical linkage allows the cruise control lever to be positioned in its neutral position. However, due to the fact that such mechanical linkages have more number of parts, they are quite complex in their structure and difficult to be maintained. Additionally, cost and maintenance problems are also present in such mechanical linkages. Thus, there is a need to provide a much lesser mechanical linkage that has less number of parts and solves at least some of the above mentioned problems.

SUMMARY OF THE INVENTION

Accordingly disclosed herein is an operating mechanism for disengaging a cruise control lever operatively engaged with a hydrostatic transmission of an off-road vehicle, the cruise control lever rotatably mounted over a holding bracket and capable of being acted upon by biasing and counter-biasing forces along a rotational axis of the cruise control lever, the biasing force exerting a preload on the cruise control lever allowing continuous engagement of the cruise control lever with the hydrostatic transmission whereas the counter-biasing force releasing the preload therefrom, the operating mechanism including a first cable and a second cable, the first and second cables coupled to LH and RH brake pedals, respectively, via their one end and extending to be operatively coupled to a brake actuation linkage assembly via their opposite end, the brake actuation linkage assembly applying a de-accelerating force on a pair of ground wheels when the LH and RH brake pedals are depressed, a cable holding member formed to have equilateral triangular ends and coplanarly arranged between the first and second cables nearby their opposite ends, first and second ends of the cable holding member engaging a portion of the first and second cables, respectively, whereas a third end thereof disposed substntially in between the first and second cables, the cable holding member retractable by a distance when the LH and RH brake pedals are applied simultaneously, and a return cable coupled to a third end of the cable holding member and extendable through the cruise lever holding bracket to be operatively connected to the cruise control lever, the return cable applying a counter-biasing force on the cruise control lever in response to the distance travelled by the cable holding member.

According to some embodiments, the cable holding member is formed of a pair of plates and arranged together in spaced apart relationship to form a T-shape profile having equilateral triangular ends.

According to some embodiments, a portion of the first and second cables engageably passes through the space between the pair of plates at the first and second ends thereof, each of the first and second ends of the cable holding member pivotally retractable from their neutral positions when the corresponding LH and RH brakes pedals are applied.

According to some embodiments, a solid block is fitted at the third end of the pair of plates in between the available space and tied up to an end of the return cable.

According to some embodiments, the holding bracket includes a bottom plate perpendicularly attached to a top plate a rear side of the top plate includes a cruise shaft protruding therefrom, the cruise shaft having mounted thereon a spring biased sleeve that has a pair of diametrically opposite pins formed thereon.

According to some embodiments, the cruise shaft further includes an assembly of friction washers and the cruise control lever mounted there over and disposed adjacent to the spring biased sleeve, the cruise control lever rotatable over the cruise control lever along its rotational axis, and wherein the spring biased sleeve exerts a biasing force on the assembly of friction washers and the cruise control lever along the rotational axis so as to allow the cruise control lever to be under the preload.

According to some embodiments, the bottom plate includes a pair of puller plates pivotally attached to the bottom plate via their one end and disposed on diametrically opposite sides of the cruise shaft, each of the puller plates including a top slot formed at top end thereof and including a central slot formed at a middle portion thereof, both the central slots engaging a corresponding pin of the spring biased sleeve.

According to some embodiments, the top slots of both the puller plates engages a connecting pin, the connecting pin engaging an end of the return cable that passes through a hole formed within the top plate, and wherein when the cable holding member is displaced to a distance the return cable pulls the puller plate thereby allowing the pair of pins to be pressed towards the top plate resulting in a counter biasing force to be acted on the assembly of friction washers and the cruise control lever.

According to another aspect of the present invention, an operating mechanism for controlling ground speed of an off-road vehicle in forward and reverse directions, the vehicle including an engine that is operably coupled to a hydrostatic transmission for driving a pair of ground wheels, the mechanism including a forward pedal and a reverse pedal disposed adjacent to each other and engageable by a foot of an operator in a manner that the level of depression of the forward and reverse pedals corresponds to the controlled ground speed of the off road vehicle in forward and reverse directions, respectively, and a linkage assembly operably connected between a servo shaft rotatably coupled to the hydrostatic transmission and the forward and reverse pedals, the servo shaft including a radial arm and angularly rotatable in opposite directions to control actuation of the oil control valves of the hydrostatic transmission, the linkage assembly including, a bracket member rigidly attached to a transmission casing of the off road vehicle and having a pin protruding perpendicularly therefrom, a sleeve rotatably mounted over the pin and formed to have a pair of top radial arms and at least one bottom radial arm, one of the top radial arms oriented along a front side of the vehicle and operably connected to the forward pedal through a first connecting link that allows the sleeve to be angularly rotated in clockwise direction when the forward pedal is depressed, the other top radial arm oriented along a rear side of the vehicle and operably connected to the reverse pedal through a second connecting link that allows the sleeve to be angularly rotated in counter-clockwise direction when the reverse pedal is depressed, a third connecting link pivotally connected between the at least one bottom radial arm and the radial arm of the servo shaft, the third connecting link linearly displaceable so as to convert the angular rotations of the sleeve into an equal and opposite angular rotations of the servo shaft, and an automatic pedal return means operably coupled to the sleeve, the automatic pedal return means allowing the sleeve to be returned to its neutral position when the operator releases the forward and reverse pedals.

According to some embodiments, the automatic pedal return means includes, a cam member attached to sleeve and formed to have a V-profile, a follower rotatably attached on a roller arm that is pivotally connected to a side face of the bracket member, the follower positioned in the middle of the V-profile cam when the sleeve is in the neutral position and capable of following an upper half and a lower half of the V-profile cam when the sleeve is rotated in the clockwise and counter-clockwise directions, respectively, and a biasing member connected between a free end of the roller arm and a portion of the forward and reverse pedals bracket and being disposed to an expanded state from a normal state, the follower follows the upper and lower half of the V-profile cam when the biasing member is in the expanded state and the follower is in the middle of the V-profile cam when the biasing member is in the normal state.

According to some embodiments, wherein a switch bolt is mounted adjacent to the free end of the roller arm, the switch bolt contacting a steel ball of a safety switch when the biasing member is in the normal state and the switch bolt separated from the steel ball when the biasing member is in the expanded state.

A BRIEF DESCRIPTION OF THE DRAWINGS

The above-mentioned and other features and advantages of the various embodiments of the invention, and the manner of attaining them, will become more apparent will be better understood by reference to the accompanying drawings, wherein.

Figure 6:
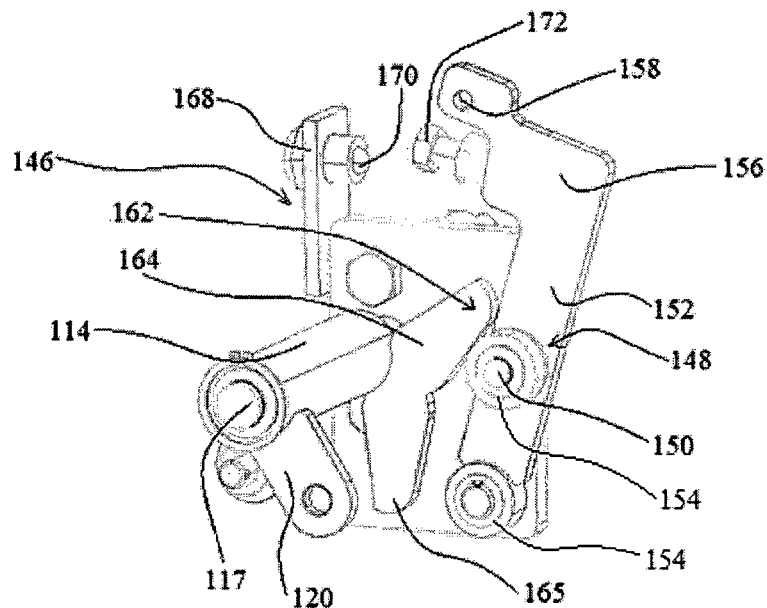
FIG. 6 is a perspective view of the cam-follower assembly of FIG. 5 showing operational arrangement between the sleeve of the linkage assembly and the cam-follower assembly when the forward pedal is depressed.
Figure 7:
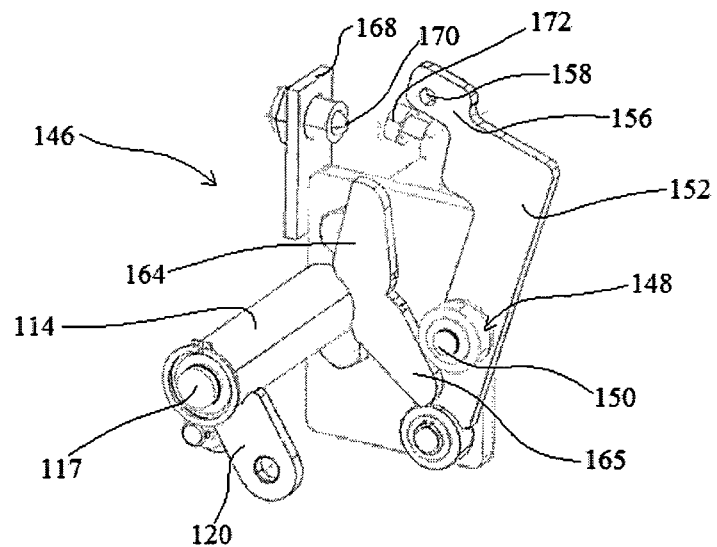
Figure 8:
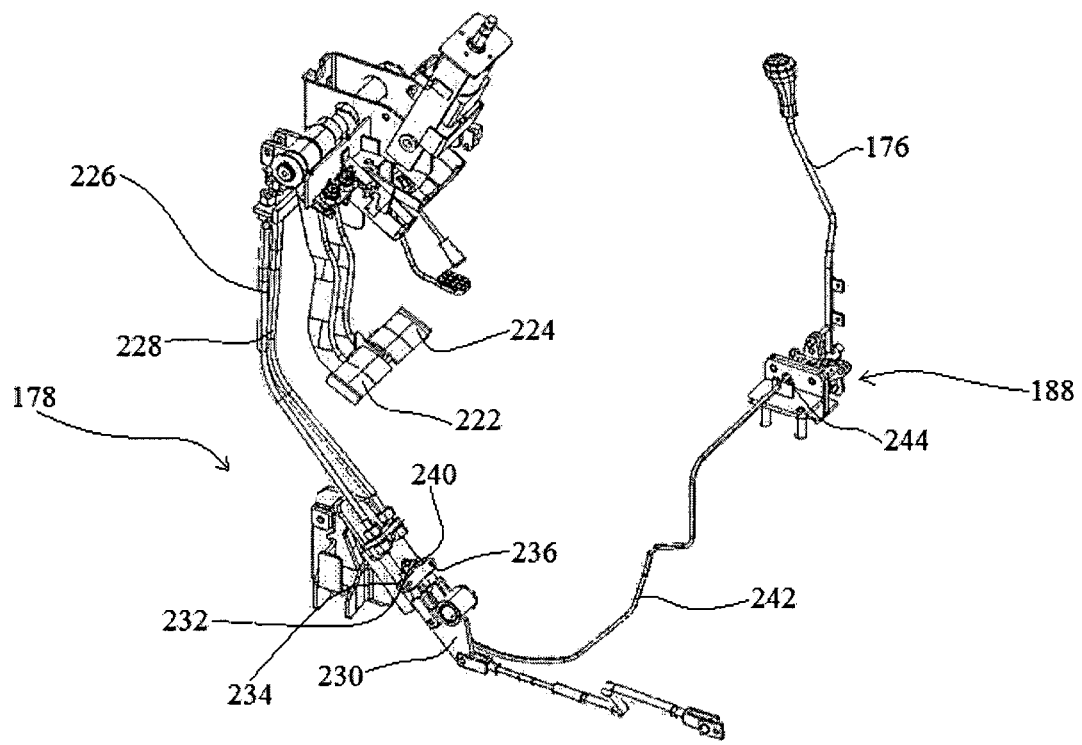
Figure 9:
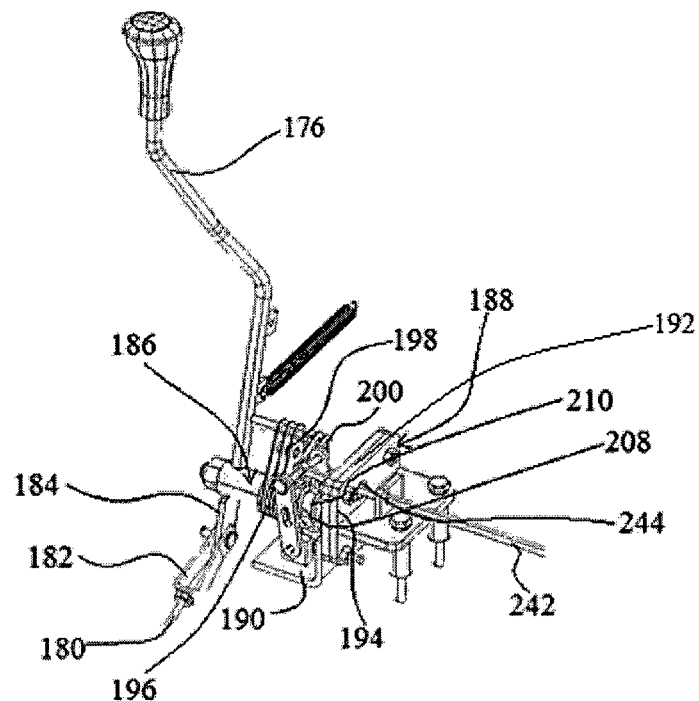
Figure 10:
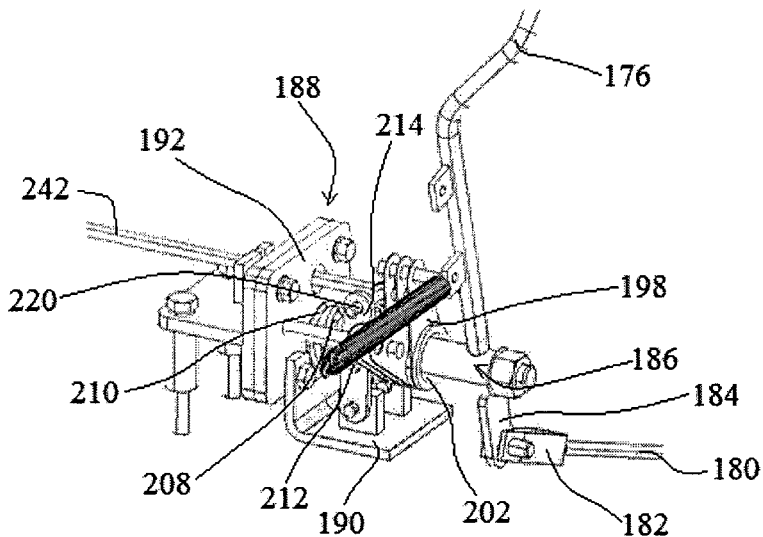
Figure 11:
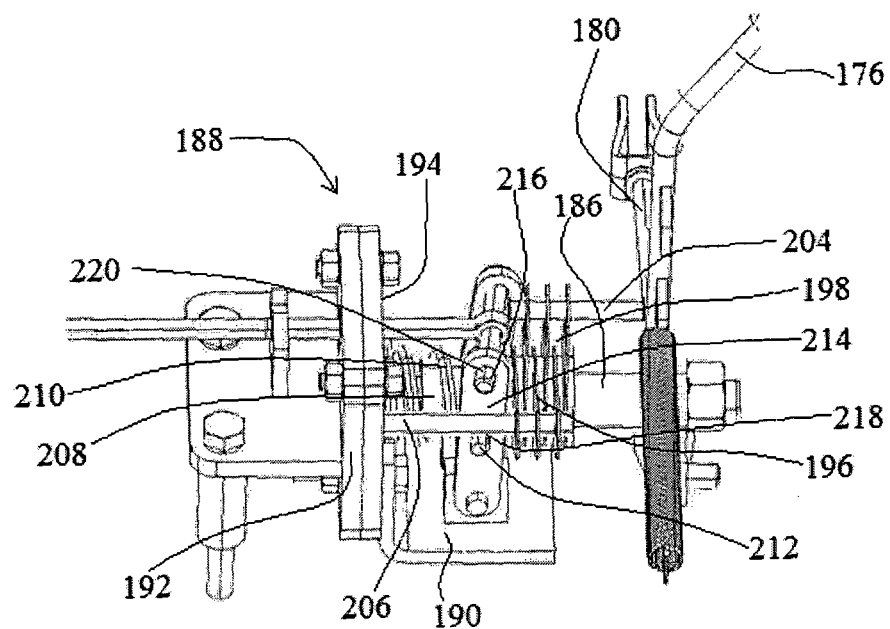
Figure 12:
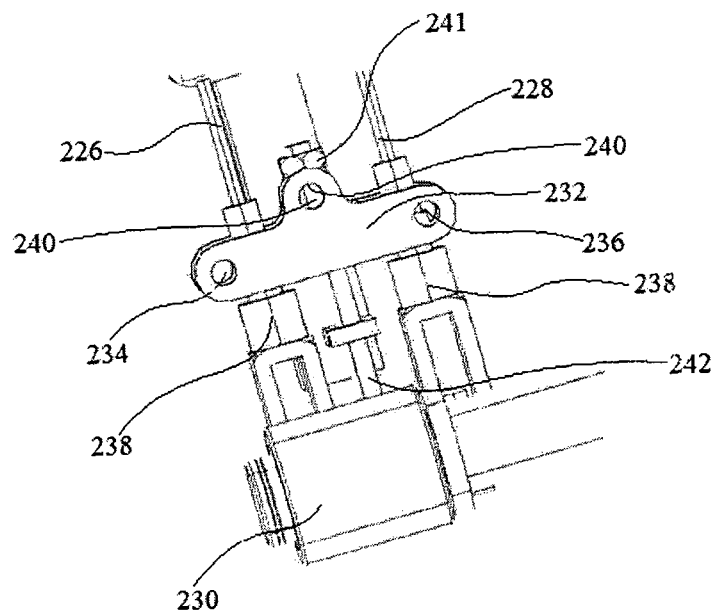

FIG. 7 is a perspective view of the cam-follower assembly of FIG. 6 showing operational arrangement between the sleeve of the linkage assembly and the cam-follower assembly when the reverse pedal is depressed FIG. 8 is a perspective view of an another operating mechanism couplable with a pair of LH and RH brake pedals for disengaging a cruise control lever from the hydrostatic transmission according to another embodiment of the present invention;

FIG. 9 a perspective view of a portion of the operating mechanism showing a cruise shaft bracket coupled with the cruise control lever of FIG. 8;

FIG. 10 is an another perspective view of the cruise shaft bracket coupled with the cruise control lever of FIG. 9;

FIG. 11 is yet another perspective view of cruise shaft bracket coupled with the cruise control lever of FIG. 10; and FIG. 12 is a perspective view of a cable holding member of another operating mechanism of FIG. 8 according to an embodiment of the present invention.

DETAILED DESCRIPTION OF THE PREFERRED EMBODIMENTS

Figure 1:
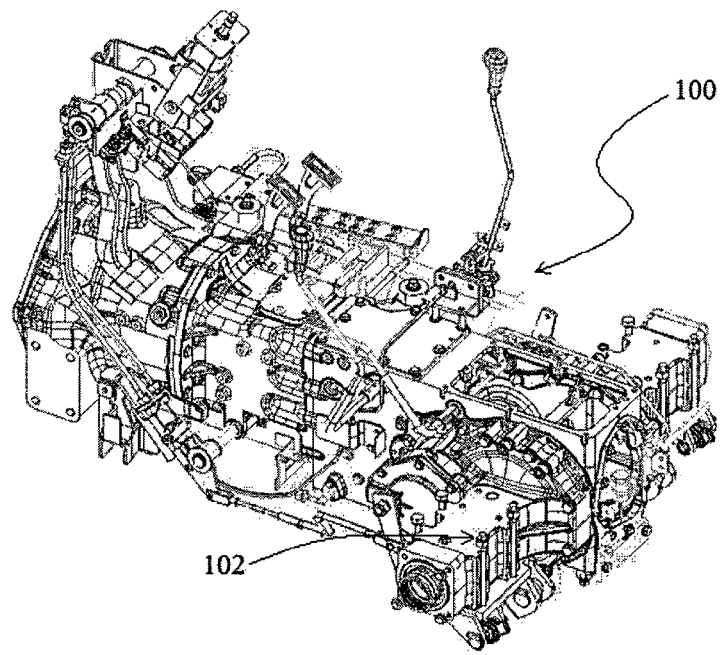
FIG. 1 is a perspective view of a transmission case assembly of an off-road vehicle having various operating mechanisms operably coupled thereon according to an embodiment of the present invention.

FIG. 1 shows an assembly of a transmission case 100 of an off-road vehicle having various operating mechanism operably coupled thereon according to an embodiment of the present invention. Preferably, the off-road vehicle is a tractor and operates on a hydrostatic transmission (HST) (not shown) that includes a hydraulic axial piston pump & an axial piston motor as a single unit. The HST is mechanically coupled between an engine and a mechanical transmission (See FIG. 1). The engine power derived from the engine is transferred to a wheel axle assembly 102 via the HST in controlled manner. Within the HST, oil control vales determine the flow rate and flow direction of the hydraulic oil to the axial piston motor thereby controlling the ground speed of the off-road vehicle in the forward and/or reverse directions.

The HST unit is positioned inside a transmission case 100 of the off-road vehicle and includes a servo shaft 104 (See FIG. 2) that protrudes outside from the HST through the transmission case. The servo shaft 104 includes a radial arm 106 (FIG. 2) disposed outside the transmission housing. The radial arm 106 when angularly rotatable results in clockwise and counter-clockwise angular rotations of the servo shaft 104. The clockwise and counter-clockwise angular rotations of the servo shaft 104 actuate the corresponding oil control valve thereby setting the direction in which the hydraulic oil will flow. This further result in actuations of the axial piston motors that operably drives the wheel axle assembly 102 in either forward and reverse directions. Moreover, the extent to which the oil control valves are actuated to allow the flow of hydraulic oil is directly proportional to the extent to which the radial arm 106 of the servo shaft 104 is angularly rotated.

Figure 2:
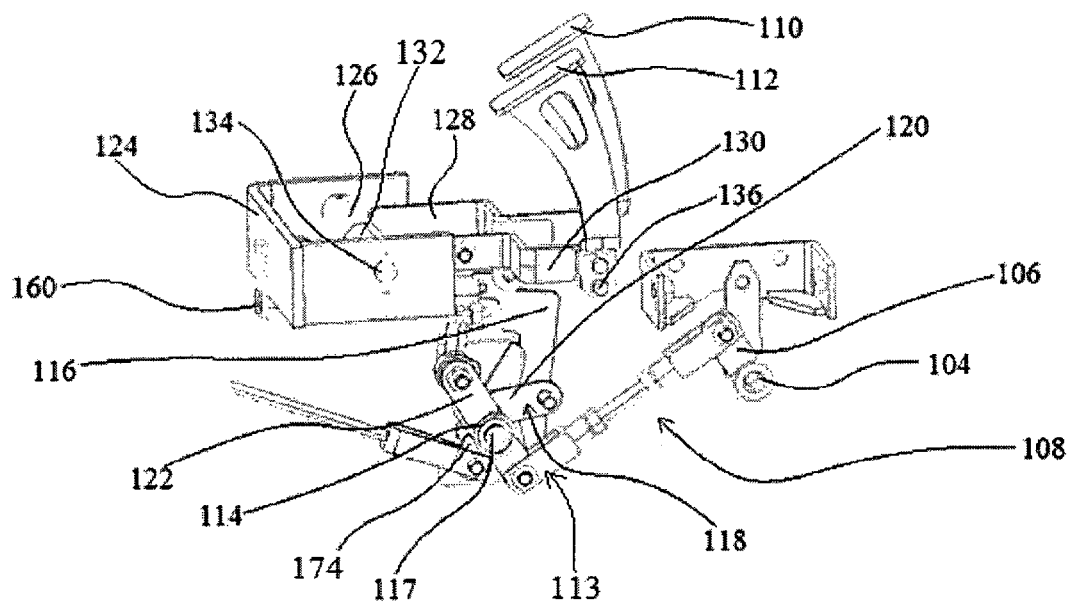
FIG. 2 is a perspective view of an operating mechanism operably coupled between forward/reverse pedals and a hydrostatic transmission (HST) of the off-road vehicle of FIG. 1, according to an embodiment of the present invention.

As shown in FIG. 2, to angularly rotate the radial arm 106 of the servo shaft 104, in forward/reverse directions, an operating mechanism 108 is shown to be operably coupled between forward/reverse pedals 110, 112 and the hydrostatic transmission (HST) of the off-road vehicle, according to an embodiment of the present invention. The forward pedal 110 and the reverse pedal 112 are disposed adjacent to each other and capable of being engaged by a foot of an operator. The level of depression of the forward and reverse pedals 110, 112 results accordingly in the extent to which the servo shaft 104 is angularly rotated in counter-clockwise and clockwise directions, respectively. This accordingly leads to the ground speed to which the off-road vehicle runs in forward and reverse directions. The objective of the operating mechanism 108 is to rotate the radial arm 106 of the servo shaft 104 in either counter-clockwise direction when the forward pedal 110 is depressed by an operator and to rotate the radial arm 106 in clockwise direction when the reverse pedal 112 is depressed.

The operating mechanism 108 includes a linkage assembly 113 that comprises of a sleeve 114 mounted to a bracket member 116. The bracket member 116 rigidly attached to a transmission case 100 of the off road vehicle with the help of fastening members (not shown) and includes a pin 117 protruding perpendicularly therefrom. The sleeve 114 is rotatably mounted over the pin 117 and acts as a central pivot. The sleeve 114 preferably includes a pair of top and bottom radial arms 118 formed thereon. The top radial arms 120, 122 and the bottom radial arms 142 are formed on a top and bottom surfaces, respectively, of the sleeve 114. The radial arms 118 may also be welded on the sleeve 114 according to another embodiment of the present invention and should be considered to be within the scope of the present invention.

Figure 3:
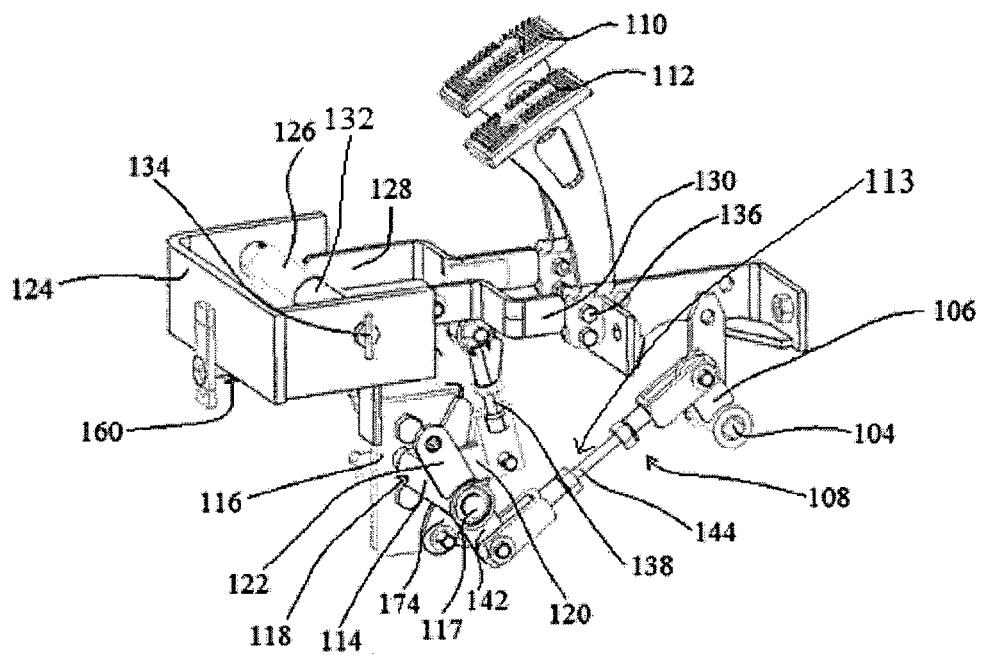
FIG. 3 is a perspective view of the operating mechanism of FIG. 2 showing orientation of a linkage assembly when the forward pedal is depressed, according to an embodiment of the present invention.
Figure 4:
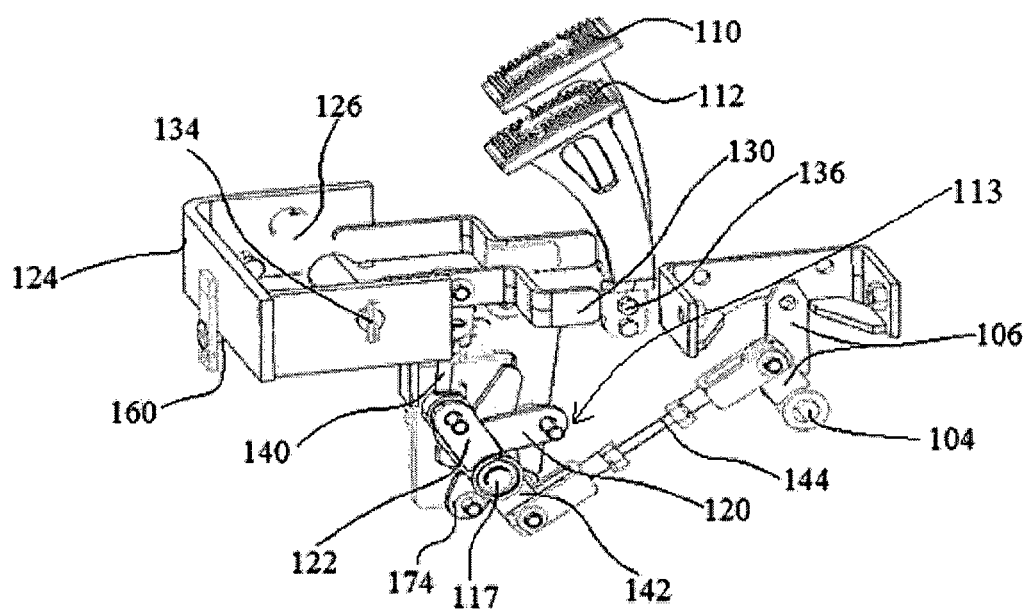
FIG. 4 is a perspective view of the operating mechanism of FIG. 3 showing orientation of the linkage assembly when the reverse pedal is depressed.

As seen in FIGS. 2 and 3, a first top radial arm 120 is formed on a top surface of the sleeve 114 and preferably arranged to be angularly oriented on to the front side of a rotational axis of the sleeve 114. A second top radial arm 122 is formed on a top surface of the sleeve 114 and preferably arranged to be angularly oriented on to the rear side of the rotational axis of the sleeve 114. As seen in FIG. 3, the first top radial arm 120 is operably connected to the forward pedal 110 and as seen in FIG. 4, the second top radial arm 122 is operably connected to the reverse pedal 112. FIGS. 2 and 3 shows a fabricated bracket 124 that, though not shown in FIGS, could be rigidly bolted to an appropriate portion of the transmission case 100 by using fastening members. The fabricated bracket 124 houses a circular shaft 126 on which forward and reverse pedal plates 128,130 are pivotally connected. Preferably, the circular shaft 126 passes through a hole in one end of the bracket 124 and rests on a bush 132 welded on the inside of the bracket. The circular shaft 126 is fixed to the bush 132 through a spring dowel pin 134 to prevent rotation about its own axis and to act as a rotational pivot for the forward and reverse pedal plates 128,130. The forward and reverse pedals plates 128, 130 have two bolts each welded on to them. These forward and reverse pedals plates 128, 130 are connected to the forward and reverse pedals 110, 112 through bolts 136, respectively.

As shown in FIGS. 3 and 4, a first connecting link 138 is connected between the forward pedal plate 128 and the first top radial arm 120 of the sleeve 114 (FIG. 3). As a skilled person in the art would observe, when the forward pedal 110 is depressed by the operator the first connecting link 138 will be displaced in downward direction that would actuate the first top radial arm 120 to be angularly rotated in clockwise direction. This accordingly allows the sleeve 114 to be angularly rotated in clockwise direction from a neutral position. Further, a second connecting link 140 is also connected between the reverse pedal plate 130 and the second top radial arm 122 of the sleeve 114 (FIG. 4). In a similar way, when the reverse pedal 112 is depressed the second connecting link 140 will be displaced in downward direction that would actuate the second top radial arm 122 to be angularly rotated in counter-clockwise direction. This accordingly allows the sleeve 114 to be angularly rotated in counter-clockwise direction from the neutral position.

As shown in FIGS. 3 and 4, a first bottom radial arm 142 is also formed on the sleeve 114 and connected to a third connecting link 144 that in turn is connected to the radial arm 106 of the servo shaft 104. The first bottom radial arm 142 is also preferably tilted on the right side of the rotational axis of the sleeve 114. The third connecting link 144 is linearly displaceable so as to convert the angular rotations of the sleeve 114 into an equal and opposite angular rotations of the servo shaft 104. So, if the sleeve 114 is angularly rotated in clockwise direction due to depression of forward pedal 110, the third connecting link 144 allows the servo shaft 104 to be rotated by equal angular rotation in the counter-clock wise direction (FIG. 3). Similarly, if the sleeve 114 is angularly rotated in counter-clockwise direction due to depression of the reverse pedal 112, the third connecting link 144 allows the servo shaft 104 to be rotated by equal angular rotation in the clock wise direction (FIG. 4). As noted above, the clockwise and counter-clockwise angular rotations of the servo shaft 104 actuate the corresponding oil control valve thereby setting the direction in which the hydraulic oil will flow.

In the following description, reference is now given to FIGS. 5-7 that describe the effect of depression of the forward and reverse pedals 110, 112 on the working of the operating mechanism 108. Further, an automatic pedal return means and it constructional arrangement with a safety neutral switch is also described when the forward and reverse pedals 110, 112 are depressed is also described.

According to an embodiment of the present invention, a V-profile cam-roller assembly 146 is used in the operating mechanism 108. It is to be noted that the primary objective of the V-profile cam-roller assembly 146 is to restore both the forward pedal 110 and the reverse pedal 112 to its original position after it has been released by the operator. As noted in the following description, the original position of the forward and reverse pedals 110, 112 is restored when the sleeve 114 returns to its neutral position. The V-profile cam-roller assembly 146 includes a follower 148 that is rotatably mounted a pin 150. The roller and the pin 150 are disposed at the centre of a roller arm 152, which is secured with a circlip 154. The roller arm 152 is capable of being pivotally displaced between neutral and inclined positions when the roller is rotated. At a free end 156 of the roller arm 152 a hole 158 is made for fixing a biasing member (preferably a pedal return spring) 160 (FIGS. 2-4). One end of the spring is fixed to the free end 156 of the roller arm 152 and the other end is fixed on to the fabricated bracket 124 (FIG. 2).

As noted above, when a pressing force is applied on the forward pedal 110 (FIG. 3), the forward pedal 110 moves downwards resulting in the sleeve 114 to be angularly rotated in clockwise direction. Clockwise rotation of the sleeve 114 causes the radial arm of the servo shaft 104 to rotate in anti-clockwise direction by the same turning degree (as that of the sleeve 114) from its neutral position. The anti clockwise rotation of the servo shaft 104 may be tuned to allow the off-road vehicle to move in forward direction. Further, when the forward pedal 110 moves downward the sleeve 114 is in the process of being rotated in the clockwise direction. At this time the follower 148, which is rotatably mounted to the roller arm 152, moves on an upper leg 162 of a V-profile cam 164 (FIG. 6). As seen in FIGS. 5-7, the V-profile cam 164 is preferably welded on the sleeve 114.

Movement of the follower 148 on the upper leg 162 of the V-profile cam 164 also causes the roller arm 152 to pivotally move to the inclined position (form the neutral position) (See FIG. 6) resulting in the foot pedal spring to be disposed in its expanded state. When the operator releases the forward pedal 110, the extended spring retracts by its virtue and the foller 156 rides back on the upper leg 162 of V-profile cam 164 to return to the middle point of the V-profile cam 164 (FIG. 5). Simultaneously, the sleeve 114 also turns back into its neutral position thereby restoring the forward pedal 110 to its original position.

In a similar manner, when a pressing force is applied on the reverse pedal 112 (FIG. 4), the reverse pedal 112 moves downwards resulting in the sleeve 114 to be angularly rotated in counter-clockwise direction. Counter-clockwise rotation of the sleeve 114 causes the radial arm of the servo shaft 104 to rotate in clockwise direction by the same turning degree from its neutral position. The clockwise rotation of the servo shaft 104 is tuned to allow the off-road vehicle to be moved in the reverse direction. Further, when the reverse pedal 112 moves downward the sleeve 114 is rotating in counter-clockwise direction. At this time the follower 148, which is rotatably mounted to the roller arm 152, moves on a lower leg 165 of a V-profile cam 164 (FIG. 7). Movement of the follower 148 on the lower leg 165 of the V-profile cam 164 also causes the roller arm 152 to pivotally move to the inclined position (form the neutral position) resulting in the foot pedal spring to again expand. When the operator releases the reverse pedal 112, the extended spring retracts by its virtue and the foller 156 rides back on the lower leg 165 of V-profile cam 164 and returns to the middle thereof (FIG. 5). This also allows the sleeve 114 to turn back into its neutral position thereby restoring the reverse pedal 110 to its original position.

Figure 5:
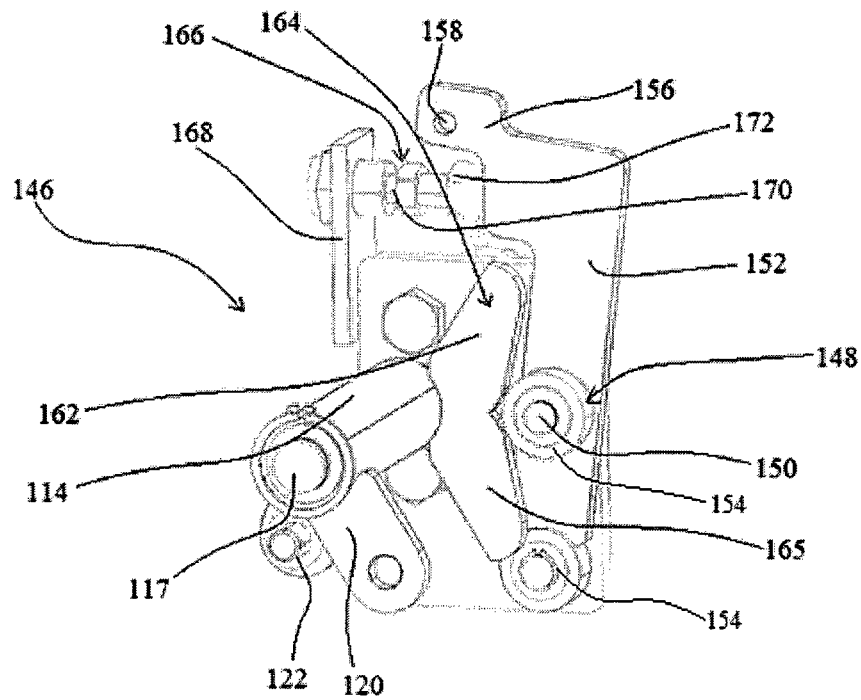
FIG. 5 is a perspective view of a cam-follower operably coupled to the linkage assembly of FIGS. 3 and 4 and showing a sleeve of the linkage assembly in its neutral position when none of the forward and reverse pedals are depressed, according to an embodiment of the present invention.

FIGS. 5-7 also shows a perspective view of the safety neutral switch 166 operably connected to the V-profile cam-roller assembly 146, according to another embodiment of the present invention. As shown in FIG. 5, the safety neutral switch 166, which is in its neutral position, is assembled on a plate 168 that may be connected to an appropriate portion of the transmission case 100 in a known manner. The safety neutral switch 166 is positioned in such a manner that when the forward pedal 110 and the reverse pedal 112 is in their respective neutral positions (with the follower 148 being positioned in the middle of the V-profile cam 164), a steel ball 170 of the neutral safety switch is pressed inside by a bolt 172 mounted on the free end 156 of the roller arm 152. The safety neutral switch 166 remains in pressed condition due to the preload of pedal return spring 160 (in its normal compressed state) that will keep the roller arm 152 and the bolt 172 pulled towards the neutral switch. In this condition, the electrical circuit from the neutral switch 166 to the ignition switch (not shown) is closed and the off-road vehicle can be easily started. FIGS. 6 and 7 refer to relation of the neutral switch 166 with respect movement of the forward and reverse pedals 110, 112 when the tractor is not in operation. Any slight movement of either the forward pedal 110 or the reverse pedal 112 will result in the pedal return spring 160 getting extended to its expanded state. Once the bolt 172 releases force, the steel ball 170 comes out by the amount by which it was compressed. This action causes the electrical circuit to open and in this condition the off-road vehicle will not start. This is extremely important from the safety point of view and complying and maintaining safety standards.

As seen in FIGS. 2-7, the sleeve 114 also includes a second bottom radial arm 174 that according to FIGS. 9-11 may be pivotally connected to a flexible cable 180 that is eccentrically pivoted to a cruise control lever 176. The flexible cable 180 allows the sleeve 114 to be rotated in clockwise direction when the cruise control lever 176 is actuated thereby resulting in the continuous engagement of the cruise control lever 176 with the HST. FIG. 8 shows another operating mechanism 178 for disengaging the cruise control lever 176 from the hydrostatic transmission according to one embodiment of the present invention. As noted above, this operating mechanism 178 is operably coupled to the operating mechanism 108 via the second bottom arm of the sleeve 114 to which the flexible cable 180 is attached. The advantage with the cruise control lever 176 is that the cruise control lever 176 is used for setting the travel speed of the off-road vehicle to the required levels and retains the travel speed till further change in speed is required.

As seen in FIGS. 9-10, the cruise control lever 176 is operably connected to a second bottom radial arm 174 of the sleeve 114 through the flexible cable 180 which has a pair of connecting yokes 182. One of the yokes 182 of the flexible cable 180 is rigidly connected to the second bottom radial arm 174 and the other yoke 182 is connected to an extending member 184 of the cruise control lever 176.

The cruise control lever 176 is rotatably mounted over a cruise shaft 186 that is preferably welded to a cruise shaft bracket 188. As seen in FIG. 10, the cruise shaft bracket 188 comprises of a bottom plate 190 perpendicularly attached to a top plate 192. The cruise shaft bracket 188 is bolted on the transmission case 100 of the off-road vehicle in known manner. The cruise shaft 186 is mounted to a rear side 194 of the top plate 192 in a manner as shown in FIGS. 10 and 11. As shown in FIGS. 10 and 11, an assembly of a plurality of friction washers 196 and a plurality of intermediate plates 198 are assembled on to the cruise shaft 186. The arrangement of this assembly is in such a manner that between any two immediate intermediate plates 198, a friction washer 196 is tightly sandwiched. Further, the even numbered intermediate plates 198 and the odd-numbered intermediate plates 198 are linearly arranged in. Furthermore, each of the intermediate plate 198 consists of two holes, a small top hole 200 and a larger bottom hole 202, formed therein. During assembly, all of the intermediate plates 198 are assembled on the cruise shaft 186 through their respective bottom holes 202. Further, as seen in FIG. 11, a first rod 204 that is welded on the cruise control lever 176 passes through the top hole 200 of each of the even-numbered intermediate plates 198. Furthermore, a second rod extends outwardly from the top plate 192 and passes through top hole 200 of each of the odd-numbered intermediate plates 198.

As seen in FIGS. 10 and 11, prior to mounting all the intermediate plates 198 a spring biased sleeve 208 is inserted over the cruise shaft 186. Further, on the spring biased sleeve 208, spring 210 is assembled. Over the cruise shaft 186 the cruise control lever 176 rotatably mounted that is capable of being acted upon by biasing and counter-biasing forces along a rotational axis of the cruise control lever 176. The spring 210 is arranged over the spring biased sleeve 208 in such a manner that the spring 210 exerts a continuous biasing force (preload) on the cruise control lever 176.

This preload allows the cruise control shaft to remain in the actuated position after the cruise control lever 176 is actuated by the operator. As a result of this preload, the flexible cable 180 ensures the second bottom radial arm 174 and the sleeve 114 to remain ruined in clockwise direction. This further ensures that the servo shaft 104 is continuously angularly rotated in counter-clockwise direction thereby allowing the off-road vehicle to keep moving in forward direction.

The spring biased sleeve 208 also includes at least a pair of small pins 212 placed diametrically opposite to each other in a manner as shown in FIG. 11. Furthermore, as seen in FIGS. 10 and 11, the bottom plate 190 includes a pair of puller plates 214 arranged in vertical position and pivotally attached to the bottom plate 190 via their one end and disposed on diametrically opposite sides of the cruise shaft. Each of the puller plate 214 also has a top slot 216 and a central slot 218 and arranged over the bottom plate 190 in such a manner that the two horizontal pins 212 of the spring biased sleeve 208 rests inside the central slot 210 of the puller plate 214. The two puller plates 214 are operably connected to each other though a pin 220 (See FIG. 9) passing through the top slots 208, respectively. A skilled person in the art will observe from the following description that when the pin 220 is pulled towards the rear side 194 of the top plate 192 of the cruise shaft bracket 188, a counter-biasing force is exerted on the assembly of the plurality of intermediate plates 198 and the cruise control lever 176. This counter-biasing force releases the preload on the cruise control lever 176. As the cruise control lever 176 is connected to a return spring (See FIGS. 9-11) that is in its expanded state, the loss of preload will allow the cruise control lever 176 to be pulled backward under the influence of the return spring.

When the cruise control lever 176 is pushed forward by the operator, the cable connecting the extending member 184 of the cruise control lever 176 pulls the second bottom radial arm 174 of the sleeve 114. This pull causes the sleeve 114 to rotate in clockwise direction and simultaneously allows the radial arm 106 of the servo shaft 104 to rotate in counter-clockwise direction thereby resulting in the off-road vehicle to travel in forward direction. As the cruise control lever 176 is mounted on the cruise shaft 186 that is subjected to the preload, the cruise control lever 176 will remain at the set position. In order to maintain the safety of the vehicle, the cruise control linkage mechanism is designed in such a way that it allows the off-road vehicle to cruise only in forward direction but not in reverse direction. When the cruise control lever 176 is pulled backwards by the operator the flexible cable 180 slacks and therefore the force from the cruise control lever 176 is not transmitted to the sleeve 114.

For returning the cruise control lever 176 back to its original position, the cruise control lever 176 is operably connected to left hand and right hand brake pedals 222, 224 (LH & RH brake pedals) through the operating mechanism 178 (See FIG. 8). Further, FIGS. 8-12 show connection between the operating mechanism 178 and the LH and RH brake pedals 222, 224 according to another embodiment of the present invention. As seen in FIG. 8, the LH and RH brake pedals 222, 224 are connected to a corresponding first cable 226 and a second cable 228, respectively. Both the first and second cables 226, 228 are coupled to LH and RH brake pedals 222, 224 via their one end having yokes 238 at their ends. Further, the LH & RH brake pedals 222, 224 extend along their lengths to be operatively coupled to a brake actuation linkage assembly 230 via their opposite end having yokes 238. When either or both of the LH and RH brake pedals 222, 224 are depressed, the brake actuation linkage assembly 230 accordingly applies a de-accelerating force on the ground wheels.

Further, as shown in FIGS. 8 and 12, a cable holding member 232, which is formed to have equilateral triangular ends, is coplanarly arranged between the first and second cables 226, 228 nearby their opposite ends in such a manner that a portion of the first and second cables 226, 228 engageably passes through the cable holding member 232 at first and second ends 234, 236 thereof. In one embodiment of the present invention, the cable holding member 232 is formed of a pair of plates 232 and arranged together in spaced apart relationship to form a T-shape profile having equilateral triangular ends. One of the T-shaped plates 232 is placed above the two first and second cable yokes 238 and the other T-shaped plate 228 is placed below the two first and second cable yokes 238 in a manner shown in FIGS. 8 and 12. The two T-shaped plates 232 are connected together by spacers and bolts in known manner. The two T-shaped plates 232 are disposed between the first and second cables 226, 228 in such a manner that a third end 240 of the cable holding member 232 is disposed substantially in therebetween. Further, a solid cubical block 241 is fitted at the third end 240 of the pair of plates 232. The cable holding member 232 and the first and second cables 226, 228 are arranged in such a manner that when both the LH and RH brake pedals 222, 224 are applied simultaneously, the first end 234 and the second end 236 of the T-shaped plates 232 are pivotally retractable to a 'predetermined' distance from their neutral positions. However, when any one of the LH and RH brake pedals 222, 224 is applied, the T-shaped plates 232 only move only half of the predetermined distance. This predetermined distance is designed to be good enough to apply the above noted counter-biasing force on the cruise control lever 176.

FIGS. 8-11 also show a cruise return cable 242 connected between the pair of T-shaped plates 232 and the pin 220 of the puller plates 214. The top plate 192 of the cruise shaft bracket 188 has a central hole 244 formed therein. Preferably, an outer portion of the return cable 242 may be assembled in a central hole 244 of the cruise holding bracket 190 and an inner wire of the return cable 242 may be passed through the central hole 244 and locked to the pin 220 connected to both the puller plates 214. Further, the other end of the cruise return cable 242 may also be locked with the cubical block 241. The cubical block 241 is preferably threaded. So, once both the LH and RH brake pedals 222, 224 are applied simultaneously, the first and second cables 226, 228 along with the cruise return cable 242 are pulled. As a result of pulling of the cruise return cable 242, the two puller plates 214 that are connected to the cruise return cable 242 through the pin 220 are pulled towards the top plate 192 of the cruise shaft bracket 188 resulting in easing out of the preload on the cruise control lever 176. Once, the frictional forces eases, the return spring 240 connected to the cruise control lever 176 pull the cruise control lever 176 in its original position.

From the design point of view it is noted that the operating mechanism 178 is designed in such a manner that the cruise control lever 176 does not return to its neutral position when either of the LH or RH brake pedals 222, 224 are applied independently. This feature is required to keep the off-road vehicle in motion when the cruise control lever 176 is engaged and the tractor is steered with the help of either the LH or RH brake pedals 222, 224. When the LH or RH brake pedals 222, 224 are applied independently, only one of the first and second cables 226, 228 moves inwards. This independent movement of the first and second cables 226, 228 causes either the first end 234 or the second end 236 of the T-shaped plates 232 to be displaced thereby causing very minimal movement of the cruise return cable 242. The travel of the cruise return cable 242 is insufficient to compress the spring 210 of the spring biased sleeve 208 and therefore the cruise control lever 176 will remain in its set position.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

The invention claimed is:

1. An operating mechanism for disengaging a cruise control lever operatively engaged with a hydrostatic transmission of an off-road vehicle, the cruise control lever rotatably mounted over a cruise shaft bracket and capable of being acted upon by biasing and counter-biasing forces along a rotational axis of the cruise control lever, the biasing force exerting a preload on the cruise control lever allowing continuous engagement of the cruise control lever with the hydrostatic transmission whereas the counter-biasing force releasing the preload therefrom, the operating mechanism comprising:

a first cable and a second cable, the first and second cables coupled to LH and RH brake pedals, respectively, via their one end and extending to be operatively coupled to a brake actuation linkage assembly via their opposite end, the brake actuation linkage assembly applying a de-accelerating force on a pair of ground wheels when the LH and RH brake pedals are depressed;

a cable holding member formed to have equilateral triangular ends and coplanarly arranged between the first and second cables nearby their opposite ends, first and second ends of the cable holding member engaging a portion of the first and second cables, respectively, whereas a third end thereof disposed substantially in between the first and second cables, the cable holding member retractable by a distance when the LH and RH brake pedals are applied simultaneously; and a return cable coupled to a third end of the cable holding member and extendable through a cruise lever holding bracket to be operatively connected to the cruise control lever, the return cable applying a counter-biasing force on the cruise control lever in response to the distance travelled by the cable holding member.

2. The operating mechanism according to claim 1, wherein the cable holding member is formed of a pair of plates and arranged together in spaced apart relationship to form a T-shape profile having equilateral triangular ends.

3. The operating mechanism according to claim 2, wherein a portion of the first and second cables engageably passes through the space between the pair of plates at the first and second ends thereof, each of the first and second ends of the cable holding member pivotally retractable from their neutral positions when the corresponding LH and RH brakes pedals are applied.

4. The operating mechanism according to claim 2, wherein a solid block is fitted at the third end of the pair of plates in between the available space and tied up to an end of the return cable.

5. The operating mechanism according to claim 1, wherein the holding bracket includes a bottom plate perpendicularly attached to a top plate, a rear side of the top plate includes a cruise shaft protruding therefrom, the cruise shaft having mounted thereon a spring biased sleeve that has a pair of diametrically opposite pins formed thereon.

6. The operating mechanism according to claim 5, wherein the cruise shaft further includes an assembly of friction washers and the cruise control lever mounted there over and disposed adjacent to the spring biased sleeve, the cruise control lever rotatable over the cruise control lever along its rotational axis, and wherein the spring biased sleeve exerts a biasing force on the assembly of friction washers and the cruise control lever along the rotational axis so as to allow the cruise control lever to be under the preload.

7. The operating mechanism according to claim 5, wherein the bottom plate includes a pair of puller plates pivotally attached to the bottom plate via their one end and disposed on diametrically opposite sides of the cruise shaft, each of the puller plates including a top slot formed at top end thereof and including a central slot formed at a middle portion thereof, both the central slots engaging a corresponding pin of the spring biased sleeve.

8. The operating mechanism according to claim 7, wherein the top slots of both the puller plates engages a connecting pin, the connecting pin engaging an end of the return cable that passes through a hole formed within the top plate, and wherein when the cable holding member is displaced to a distance the return cable pulls the puller plate thereby allowing the pair of pins to be pressed towards the top plate resulting in a counter biasing force to be acted on the assembly of friction washers and the cruise control lever.

9. An operating mechanism for controlling ground speed of an off-road vehicle in forward and reverse directions, the vehicle including an engine that is operably coupled to a hydrostatic transmission for driving a pair of ground wheels, the mechanism comprising:

a forward pedal and a reverse pedal disposed adjacent to each other and engageable by a foot of an operator in a manner that the level of depression of the forward and reverse pedals corresponds to the controlled ground speed of the off road vehicle in forward and reverse directions, respectively; and a linkage assembly operably connected between a servo shaft rotatably coupled to the hydrostatic transmission and the forward and reverse pedals, the servo shaft including a radial arm and angularly rotatable in opposite directions to control actuation of the oil control valves of the hydrostatic transmission, the linkage assembly including:

a bracket member rigidly attached to a transmission casing of the off road vehicle and having a pin protruding perpendicularly therefrom;

a sleeve rotatably mounted over the pin and formed to have a pair of top radial arms and at least one bottom radial arm, one of the top radial arms oriented along a front side of the vehicle and operably connected to the forward pedal through a first connecting link that allows the sleeve to be angularly rotated in clockwise direction when the forward pedal is depressed, the other top radial arm oriented along a rear side of the vehicle and operably connected to the reverse pedal through a second connecting link that allows the sleeve to be angularly rotated in counter-clockwise direction when the reverse pedal is depressed;

a third connecting link pivotally connected between the at least one bottom radial arm and the radial arm of the servo shaft, the third connecting link linearly displaceable so as to convert the angular rotations of the sleeve into an equal and opposite angular rotations of the servo shaft; and an automatic pedal return means operably coupled to the sleeve, the automatic pedal return means allowing the sleeve to be returned to its neutral position when the operator releases the forward and reverse pedals.

10. The operating mechanism according to claim 9, wherein the automatic pedal return means includes:

a cam member attached to sleeve and formed to have a V-profile;

a follower rotatably attached on a roller arm that is pivotally connected to a side face of the bracket member, the follower positioned in the middle of the V-profile cam when the sleeve is in the neutral position and capable of following an upper half and a lower half of the V-profile cam when the sleeve is rotated in the clockwise and counter-clockwise directions, respectively; and a biasing member connected between a free end of the roller arm and a portion of the forward and reverse pedals bracket and being disposed to an expanded state from a normal state, the follower follows the upper and lower half of the V-profile cam when the biasing member is in the expanded state and the follower is in the middle of the V-profile cam when the biasing member is in the normal state.

11. The operating mechanism according to claim 10, wherein a switch bolt is mounted adjacent to the free end of the roller arm, the switch bolt contacting a steel ball of a safety switch when the biasing member is in the normal state and the switch bolt separated from the steel ball when the biasing member is in the expanded state.

12. The operating mechanism according to claim 9, wherein the sleeve includes a second bottom radial arm, the second bottom radial arm pivotally connected to a flexible cable eccentrically pivoted to a cruise control lever, the flexible cable allowing the sleeve to be rotated in clockwise direction when the cruise control lever is actuated.

* * * * *